United States Patent [19]

Taira et al.

[11] Patent Number: 4,683,263
[45] Date of Patent: Jul. 28, 1987

[54] METAL VESSEL HAVING CIRCUMFERENTIAL SIDE SEAM AND ADHESIVE PRIMER FOR USE IN PRODUCTION THEREOF

[75] Inventors: Kazuo Taira, Tokyo; Akihiko Morofuji; Seishichi Kobayashi, both of Yokohama; Hiroshi Ueno, Yokosuka, all of Japan

[73] Assignee: Toyo Seikan Kaisha Ltd., Tokyo, Japan

[21] Appl. No.: 731,384

[22] Filed: May 7, 1985

Related U.S. Application Data

[62] Division of Ser. No. 544,266, Oct. 21, 1983, Pat. No. 4,556,151.

[30] Foreign Application Priority Data

Oct. 25, 1982 [JP]  Japan ................................. 57-186110
Oct. 28, 1982 [JP]  Japan ................................. 57-188140

[51] Int. Cl.$^4$ ........................ C08L 27/06; C08L 63/00
[52] U.S. Cl. ........................................ 525/57; 525/58; 525/60; 525/108; 525/123
[58] Field of Search ................... 525/58, 108, 123, 57, 525/60

[56] References Cited

U.S. PATENT DOCUMENTS

3,466,347  9/1969  Davis .................................. 525/108
4,345,047  8/1982  Walter ................................ 525/108
4,451,506  5/1984  Kobayashi et al. ................. 525/108

*Primary Examiner*—Allan M. Lieberman
*Attorney, Agent, or Firm*—Sherman & Shalloway

[57] ABSTRACT

Disclosed is a metal vessel comprising an upper member and a lower member, each consisting of a coated cup-shaped formed metal body and a circumferential side seam being formed by lap-bonding the open ends of the upper and lower members to each other through an adhesive, wherein said coated cup-shaped formed metal body is composed of a metal blank having a coating of a vinyl chloride resin having a vinyl chloride unit content of 30 to 97% by weight and a glass transition temperature of at least 40° C. and containing carboxyl groups and/or hydroxyl groups at a concentration of 10 to 500 millimoles/100 g of the resin, said adhesive is an adhesive composed mainly of a copolyester containing in the main chain at least 50 mole %, based on the total acid component, of terephthalic acid, at least 50 mole %, based on the total alcohol component, of 1,4-butanediol and at least 1 mole % of at least one member selected from other acids and other alcohols, and the upper and lower members are bonded to each other through said vinyl chloride resin coating and said copolyester type adhesive.

7 Claims, 4 Drawing Figures

METAL VESSEL HAVING CIRCUMFERENTIAL SIDE SEAM AND ADHESIVE PRIMER FOR USE IN PRODUCTION THEREOF

This is a division of application Ser. No. 544,266, filed Oct. 21, 1983, now U.S. Pat. No. 4,556,151.

BACKGROUND OF THE INVENTION (1) Field of the Invention

The present invention relates to a metal vessel having a circumferential side seam. More particularly, the present invention relates to a bottle-shaped metal vessel which is highly improved in adhesiveness, sealing property and corrosion resistance of the seam. Furthermore, the present invention relates to an adhesive primer advantageously used for the formation of the seam of the above-mentioned metal vessel. More particularly, the present invention relates to an adhesive primer which has excellent bondability and adhesion to a copolyester type adhesive or metal substrate and also excellent adaptability to the cup-forming operation and the corrosion resistance of the seam.

(2) Description of the Prior Art

A bottle-shaped metal vessel having a circumferential side seam formed by lap-bonding circumferential open ends of cup-shaped upper and lower members obtained by draw forming or draw-ironing forming of a metal blank is advantageous in various points over a so-called can-shaped metal vessel.

As conventional packing metal vessels, there can be mentioned so-called three-piece cans in which can lids are double-seamed to the top and bottom of a can body having a side seam to form sealed portions, and so-called two-piece cans in which a can lid is double-seamed to an open end of a cup-shaped can body formed by drawing or draw-ironing of a metal blank.

However, these metal vessels having a double-seamed structure are insufficient in the pressure resistance of the sealed portion. Furthermore, these metal vessels involve a problem in connection with the saving of the material of the metal blank. More specifically, in the seam formed by double seaming, the material constituting the seam is first deformed by the load imposed on the seam, and leakage on from the seam or fracture of the seam is caused under a relatively small load by this deformation. In order to prevent this disadvantage, it is necessary that the thickness of the metal blank should considerably be increased. In the field of packing vessels, from the economical viewpoint and in order to reduce the weight of the vessel, it always is required to reduce the thickness of the metal blank. In the case where the thickness of the wall of the vessel barrel is reduced, buckling is readily caused by a load applied in the axial direction of the vessel at the double seaming step or the flanging or other preparing step.

In the case of a bottle-shaped metal vessel formed by lap-bonding open ends of cup-shaped upper and lower members, even if the thickness of the metal blank is extremely small, no deformation of the material constituting the seam is caused and the seam can resist up to a load corresponding to the shear strength of the seam irrespectively of the thickness of the metal blank. Furthermore, since the double seaming step is unnecessary, this metal vessel is advantageous in that the thickness of the side wall of the vessel can be reduced without a risk of buckling.

However, when a circumferential side seam is formed by lap-bonding open ends of cup-shaped lower and upper members, various limitations are imposed on adhesives used for lap bonding.

More specifically, although both the ends of a straight seam of a straight can body formed by lap bonding are mechanically secured by seaming with can lids, the above-mentioned circumferential side seam is not mechanically secured along the entire circumference at all, and the dimensional deformation of the seam per se is readily caused. Furthermore, since the diameter of the open end portion is going to change when the temperature changes, a stress is readily generated in the adhesive layer. Moreover, since the thickness of the open end portion constituting the seam is reduced in many cases, the seam easily undergoes deformation when an external force is applied. Therefore, it is required that the adhesive used should have a strong bonding force to the coating on the surface of the metal blank and that the adhesive layer should have high mechanical strength and dimension stability and the physical properties of the adhesive layer should be thermally stable and not be changed with the lapse of time.

Furthermore, the primer coating used should show high adhesion and bondability to both the metal blank and adhesive layer even under the above-mentioned severe conditions. Moreover, since the lower and upper members are formed by high draw processing or high draw-ironing processing, the adhesive primer and protecting coating layer should resist such processing and should have excellent corrosion resistance.

SUMMARY OF THE INVENTION

In accordance with one fundamental aspect of the present invention, there is provided a metal vessel comprising an upper member and a lower member, each consisting of a coated cup-shaped formed metal body and a circumferential side seam being formed by lap-bonding the open ends of the upper and lower members to each other through an adhesive, wherein said coated cup-shaped formed metal body is composed of a metal blank having a coating of a vinyl chloride resin having a vinyl chloride unit content of 30 to 97% by weight and a glass transition temperature of at least 40° C. and containing carboxyl groups and/or hydroxyl groups at a concentration of 10 to 500 millimoles/100 g of the resin, said adhesive is an adhesive composed mainly of a copolyester containing in the main chain at least 50 mole %, based on the total acid component, of terephthalic acid, at least 50 mole %, based on the total alcohol component, of 1,4-butane-diol and at least 1 mole % of at least one member selected from other acids and other alcohols, and the upper and lower members are bonded to each other through said vinyl chloride resin coating and said copolyester type adhesive.

In accordance with another fundamental aspect of the present invention, there is provided an adhesive primer for a metal vessel, which comprises a composition containing (A) 10 to 80% by weight, based on solids, of particles of a vinyl chloride resin having a polymerization degree of 800 to 4,000, (B) 10 to 80% by weight, based on solids, of a solvent-soluble vinyl chloride/vinyl acetate/carboxyl group- or hydroxyl group-containing vinyl unit copolymer containing carboxyl groups and/or hydroxyl groups at a concentration of 5 to 500 millimoles/100 g of the polymer and (C) 2 to 30% by weight, based on solids, of a solvent-soluble thermosetting resin having a reactivity with carboxyl groups and/or hydroxyl groups, wherein said copolymer (B) and said thermosetting resin (C) are present in a continuous phase as the dispersion medium and the vinyl chloride resin particles (A) are present as the dispersed phase dispersed in said continuous phase.

DETAILED DESCRIPTION OF THE INVENTION

Figure 1:
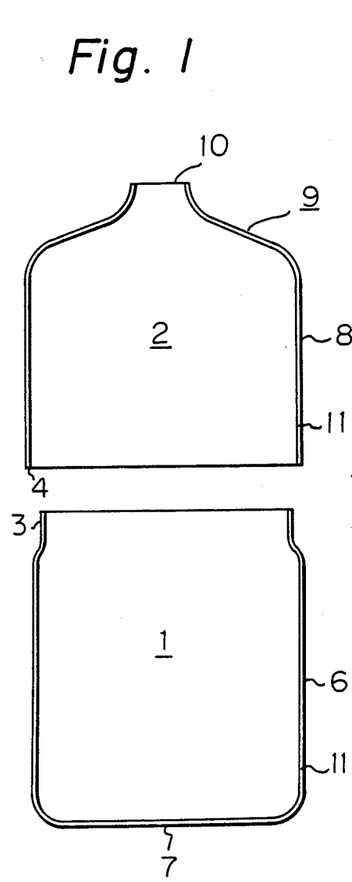
FIG. 1 is a sectional view illustrating independently upper and lower members of a metal vessel according to the present invention.
Figure 2:
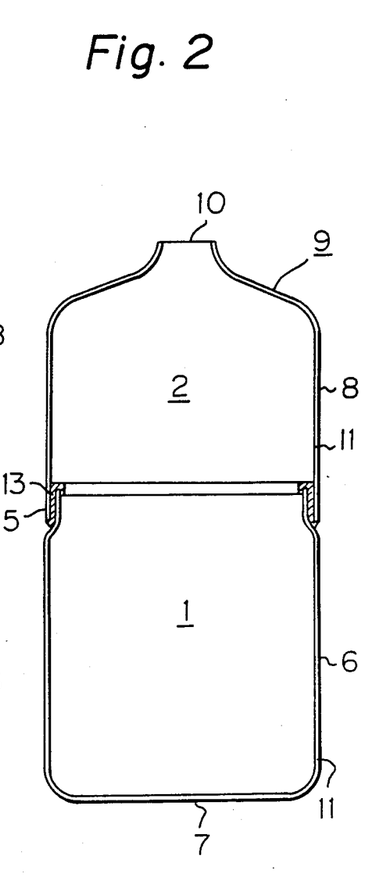
FIG. 2 is a sectional view illustrating a metal vessel formed by lap-bonding upper and lower members according to the present invention.
Figure 3:
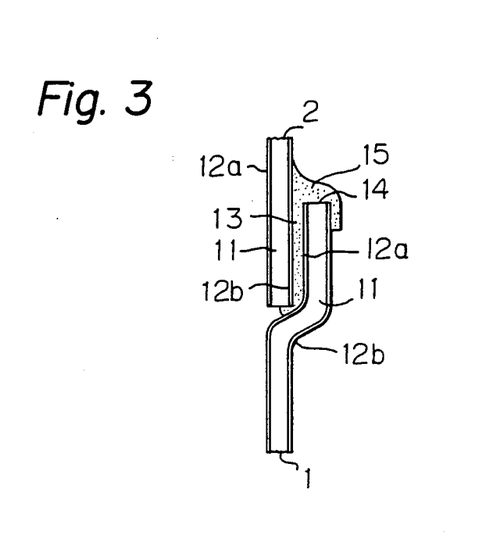
FIG. 3 is an enlarged view showing the section of the bonded portion in the metal vessel shown in FIG. 2.

Referring to FIGS. 1 through 3 illustrating an example of a metal vessel having a circumferential side seam, this bottle-shaped metal vessel comprises a lower member 1 consisting of a seamless cup-shaped molded body composed of, for example, a coated metal and an upper member 2 consisting of a seamless cup-shaped molded body composed of a coated metal. Open ends 3 and 4 of these cup-shaped bodies are lap-bonded to form a circumferential side seam 5, whereby both the upper and lower members are integrated in the form of a vessel.

In this embodiment, the lower member 1 is a cup formed by drawing of a coated metal blank and comprising a side wall 6 and a bottom 7, and the upper member 2 is a cup formed of drawing of a coated metal blank and comprising a side wall 8 and a top wall 9. The diameter of the side wall 6 of the lower member 1 is substantially the same as that of the side wall 8 of the upper member 2, and in this embodiment, both the side walls are substantially equal in the height and seam 5 is located at a substantially middle portion of the vessel. The top wall 9 of the upper member 2 has a convex taper surface and an opening 10 for filling or discharging a content is formed at the center thereof. It is seen that the upper member 2 is bonded onto the lower member 1 so that the upper member 2 forms a so-called shoulder and neck of the bottle and an upper half of the barrel of the bottle.

In the embodiment illustrated in FIG. 1, the open end portion 3 of the lower member 1 is drawn by the necking processing conducted in the vicinity thereof so that the diameter of the open end portion 3 is smaller than that of the other barrel wall portion, and the open end portion 3 is inserted into the open end portion 4 of the upper member 2 having a larger diameter. As is apparent from the enlarged view of FIG. 3, the coated metal blank constituting the upper and lower members comprises a metal substrate 11 such as surface-treated aluminum and coatings 12a and 12b acting as the primer and protecting layer. An adhesive layer 13 is formed between the outer surface of the open end portion 3 of the lower member and the inner surface of the open end portion 4 of the upper member to effect bonding and fixation of the lower and upper members. A part of the adhesive 13 protrudes from the seam 5 to form a covering layer 15 for a cut edge 14 of the metal blank located on the inner side of the seam.

The most important feature of the present invention is that the lower and upper member 1 and 2 are bonded in the arrangement of metal substrate 11/coating 12a/adhesive 13/coating 12b/metal substrate 11 by using as the coatings 12a and 12b a vinyl chloride resin having a vinyl chloride unit content of 30 to 97% by weight, preferably 50 to 95% by weight, and a glass transition temperature of at least 40° C., preferably at least 60° C., and containing carboxyl groups and/or hydroxyl groups at a concentration of 10 to 500 millimoles, preferably 20 to 400 millimoles, per 100 g of the resin, and as the adhesive a copolyester type adhesive composed mainly of a copolyester containing in the main chain at least 50 mole %, preferably at least 70 mole %, based on the total acid component, of terephthalic acid, at least 50 mole %, preferably at least 60 mole %, based on the total alcohol component, of 1,4-butane-diol, and at least 1 mole %, preferably at least 3 mole %, of at least one member selected from other acids and other alcohols.

In the present invention, there is utilized a phenomenon in which a strong bonding is produced by heating between the coating of the above-mentioned specific vinyl chloride resin and the above-mentioned specific copolyester type adhesive. More specifically, from the results of researches made by us, it has been elucidated that if the copolyester type adhesive is heat-fusion-bonded to the vinyl chloride resin coating, both the resins are mingled with each other in a very good state in the bonding interface between the coating and the adhesive and strong bonding becomes possible. It is considered that the reason why good mingling of both the resins is attained under heat fusion conditions though they are quite different from each other in the chemical structure is that the solubility parameters of both the resins are considerably close to each other.

As described, for example, in Polymer Handbook, Volume 4, compiled by J. Brandrup and published in 1967 by John Wiley and Sons, Inc., the solubility parameter (Sp value) is defined as the square root of the cohesive energy density (cal/cc). The solubility parameter has a close relation to the intensity of the hydrogen bond of a thermoplastic resin, and a thermoplastic polymer having in the main chain or side chain a polar group such as a hydroxyl group, an amide group, an ester group, a nitrile group or a hydrogen atom ordinarily has a high solubility parameter of 9 or more, which differs to some extent according to the content or distribution state of the polar group.

Sp values of polyvinyl chloride, polyethylene terephthalate and polybutylene terephthalate are shown in Table A.

TABLE A

| Resin | Sp Value [(cal/cc)$^{\frac{1}{2}}$] |
|---|---|
| Polyvinyl chloride | 9.53 |
| Polyethylene terephthalate | 10.7 |
| Polybutylene terephthalate | 9.8 |

The solubility parameter (Sp value) of the copolymer can approximately be obtained as the arithmetic mean of Sp values of homopolymers of the respective monomers. For example, the Sp value of polybutylene/ethylene tereththalate can approximately be obtained according to the following formula:

$$Sp = Bsp \cdot Bm + Esp \cdot Em \quad (1)$$

wherein

Bsp stands for the Sp value of polybutylene terephthalate, Bm stands for the mole fraction of butylene terephthalate units in the copolyester, Esp stands for the Sp value of polyethylene terephthalate, and Em stands for the mole fraction of ethylene terephthalate units in the copolyester.

The Sp value of a vinyl chloride resin of the copolymer type can similarly be obtained.

Even if ordinary polyethylene terephthalate is fusion-bonded to the vinyl chloride resin coating, no substantial adhesion is observed. On the other hand, by introducing butylene terephthalate units into the ester chain, the adhesion strength between the two resins is prominently improved. This fact suggests that by the introduction of comonomer units, heat bondability is ordinarily increased and furthermore, the mingling compatibility of both the resins in the bonding interface is improved because the solubility parameters of both the resins are made close to each other. In the present invention, it is preferred that the difference of the Sp value between the coating resin and the copolyester adhesive be smaller than 1.0 (cal/cc)$^{\frac{1}{2}}$, especially smaller than 0.8 (cal/cc)$^{\frac{1}{2}}$.

Furthermore, by using the vinyl chloride resin coating according to the present invention, there is attained not only an effect of making strong bonding to the copolyester type adhesive possible but also an advantageous effect of improving the processability of the coating and the corrosion resistance as the protective coating. As described in detail hereinafter, the vinyl chloride resin is a thermoplastic resin excellent in the mechanical properties and processability, and even if a metal blank having a coating of this resin is subjected to a high draw processing such as a draw-redraw processing, defects such as cracks, pinholes and wrinkles are not formed at all. Furthermore, the vinyl chloride resin has excellent in the water resistance though it has a relatively high polarity, and has an excellent barrier property to a metal-corrosive component contained in the content of the vessel.

In the present invention, it is important that the vinyl chloride resin coating used in the present invention should contain vinyl chloride units in an amount included within the above-mentioned range. The amount of vinyl chloride units in the coating has influence on both the bondability to the copolyester and the corrosion resistance of the metal substrate. More specifically, if the amount of vinyl chloride units contained in the coating is smaller than 30% by weight, the bondability to the copolyester is reduced and also the barrier property to a corrosive component is reduced. On the other hand, if the content of vinyl chloride units exceeds 97% by weight, the coating becomes hard and the processability and adhesion to the metal blank are reduced.

From the viewpoint of adhesion to the metal substrate, it is important that the vinyl chloride resin coating used in the present invention should contain at least one polar group selected from carboxyl and hydroxyl groups at a concentration included within the above-mentioned range. If the polar group concentration is lower than 10 millimoles per 100 g of the resin, peeling is liable to occur between the metal substrate and the coating, and if the polar group concentration is higher than 500 millimoles per 100 g of the resin, the water resistance of the coating reduced, and the corrosion resistance is lost.

It also is important that the vinyl chloride resin coating should have a glass transition temperature (Tg) of at least 40° C., especially at least 60° C. More specifically, in case of a metal vessel having a circumferential side seam, to which the present invention is directed, the load applied to the vessel during heat sterilization, storage or transportation acts substantially as the shearing force imposed on the adhesive and the coating. An ordinary vinyl chloride resin coating containing a plasticizer in a relatively large amount such as 20 to 30% by weight has a glass transition temperature close to room temperature, and this coating cannot resist the above-mentioned shearing force and peeling is readily caused between the coating and the metal substrate or adhesive layer. In contrast, since the coating of the present invention has the above-mentioned glass transition temperature, the coating can resist the shearing force imposed on the seam and degradation of the bonding or reduction of the air tightness can be prevented.

In the present invention, it is important that among various heat-fusion type thermoplastic adhesives, the above-mentioned copolyester type adhesive should be selected and used. As pointed out hereinbefore, this copolyester adhesive has an excellent adhesive force to the vinyl chloride resin coating, and is excellent over other adhesive resins in the mechanical properties such as the tensile strength and flexural strength. Furthermore, the copolyester adhesive can resist the shearing force applied to the adhesive layer and prevents degradation of the adhesive force or reduction of the air tightness even under severe conditions. Moreover, since the copolyester has good toughness and flexibility, even if distortion is caused in the adhesive layer by a stress or deformation is caused in the seam, fracture of the seam or leakage of the content is prevented. Still further, this copolyester adhesive has an excellent heat resistance and the heat-bonding temperature is within a convenient range, and the water absorption of the copolyester adhesive is smaller than that of a polyamide type hot melt adhesive and the water resistance and hot water resistance of the copolyester adhesive are excellent.

It is important that the copolyester should contain terephthalic acid, 1,4-butane-diol and other acid/or diol component in the above-mentioned amounts. The terephthalic acid component has relations to mechanical properties such as the creep resistance and the heat resistance of the copolyester, and if the amount of terephthalic acid is below the above-mentioned range, these properties are reduced. The 1,4-butane-diol component has relations to the improvement of the bonding operation adaptability due to reduction of the melting point and the flexibility and other properties of the copolyester. If the amount of 1,4-butane-diol is below the above-mentioned range, these properties are degraded. The other acid component and/or alcohol component has a relation to the improvement of the bondability or bonding operation adaptability due to reduction of the melting point. If the amount of the other acid component and/or alcohol component is below the above-mentioned range, no satisfactory results can be obtained with reference to the above-mentioned improvement.

As the metal blank to be formed into the seamless cup, there can be used an untreated steel plate (black plate), various surface-treated steel plates, for example, deposited steel plates such as tin-deposited steel plates (tin-plates), zinc-deposited steel plates, aluminum-deposited steel plates, nickel-deposited steel plates and chromium-deposited steel plates, electrolytically treated steel plates such as electrolytically chromate-treated steel plates, chemically treated steel plates such as steel plates treated with phosphate and/or chromate, plates of light metals such as aluminum, and composites thereof.

Any of vinyl chloride resins can be used as a primer coating of the metal blank, so far as the above-mentioned requirements are satisfied.

This coating contains vinyl chloride units in an amount of 30 to 97% by weight. The vinyl chloride units are present in the form of a copolymer with other monomer, or parts of the vinyl chloride units are present in the form of a copolymer as mentioned above and the remaining vinyl chloride units are present in the form of a straight resin, that is, a homopolymer.

The carboxyl groups and/or hydroxyl groups in the coating may be present in the form of a copolymer of vinyl chloride units with units of an ethylenically unsaturated monomer having such polar groups, or in the form of a blend of a vinyl chloride resin with a resin containing such polar groups. In short, it is sufficient if the vinyl chloride units and the carboxyl groups and/or hydroxyl groups are present at the above-mentioned amount and concentration in the coating, whether the coating may be composed of a copolymer or blend. From the viewpoint of the processability or adhesion of the coating, it is preferred that vinyl acetate units be contained in the main chain of the vinyl chloride resin, and the vinyl acetate units may be present in an amount of up to 30% by weight in the lacquer.

As preferred examples of the carboxyl group-giving ethylenically unsaturated monomer, there can be mentioned acrylic acid, methacrylic acid, fumaric acid, maleic anhydride, crotonic acid, itaconic acid, citraconic acid and tetrahydrophthalic anhydride, and as preferred examples of the hydroxyl group-giving monomer, there can be mentioned vinyl alcohol (that is, saponified vinyl acetate), hydroxyethyl acetate, hydroxyethyl methacrylate, hydroxypropyl acrylate and hydroxypropyl methacrylate.

As preferred examples of the vinyl chloride resin, there can be mentioned polyvinyl chloride, a vinyl chloride-vinyl acetate copolymer, a partially saponified vinyl chloride-vinyl acetate copolymer, a vinyl chloride-vinyl acetate-acrylic acid copolymer, a partially saponified and partially butylated vinyl chloride-vinyl acetate copolymer, a vinyl chloride-vinyl acetate-methacrylic acid copolymer, a vinyl chloride-vinyl acetate-maleic anhydride copolymer, a vinyl chloride-vinyl acetate-hydroxyethyl acrylate copolymer and a vinyl chloride-vinyl acetate-hydroxyethyl methacrylate copolymer. It is ordinarily preferred that a resin free of carboxyl groups and/or hydroxyl groups, such as polyvinyl chloride or a vinyl chloride-vinyl acetate copolymer, be used in the form of a blend with a vinyl chloride copolymer having carboxyl groups and/or hydroxyl groups.

The vinyl chloride resin may be used in combination of at least one member selected from thermosetting resins, especially hydroxyl group-containing thermosetting resins, such as resol type phenol-aldehyde resins, novolak type phenol-aldehyde resins, urea-aldehyde resins, melamine-aldehyde resins, epoxy resins and alkyd resins.

According to one preferred embodiment of the present invention, at least one of the coatings 12a and 12b is formed by using a coating composition comprising (A) 10 to 80% by weight, based on solids, of particles of a vinyl chloride resin having a polymerization degree of 800 to 4,000, (B) 10 to 80% by weight, based on solids, of a solvent-soluble vinyl chloride/vinyl acetate/carboxyl group- or hydroxyl group-containing vinyl unit copolymer containing carboxyl groups and hydroxyl groups at a concentration of 5 to 500 millimoles/100 g of the polymer and (C) 2 to 30% by weight, based on solids, of a thermosetting resin having a reactivity with carboxyl groups and/or hydroxyl groups.

In this coating composition, the vinyl chloride resin particles (A) exerts a function of increasing the amount or concentration of vinyl chloride units in the coating to improve the barrier property of the coating to corrosive components. The coating composition containing the vinyl chloride resin particles (A) is excellent over a coating composition free of the vinyl chloride resin particles in that the processability of the coating is improved and the coated metal plate can be subjected to draw processing or deep draw processing without generation of the above-mentioned defects in the coating. Furthermore, the vinyl chloride resin particles (A) provide other advantages. For example, the adaptability to the coating operation is improved and a thick coating can be formed on the metal blank. Moreover, the vinyl chloride resin particles (A) increases the amount or concentration of vinyl chloride units in the coating, whereby the adhesiveness of the coating to the copolyester adhesive is enhanced.

It is important that the vinyl chloride resin particles (A) be contained in an amount of 10 to 80% by weight, especially 20 to 60% by weight. If the amount of the vinyl chloride resin particles is below the above-mentioned range, the above-mentioned advantages cannot be attained. If the amount of the vinyl chloride resin particles exceed the above-mentioned range, the adhesion to the metal substrate and the processability of the coating are degraded as compared with these properties attained when the amount of the vinyl chloride resin particles is within the above-mentioned range. From the viewpoint of processability, it is important that the polymerization degree of the vinyl chloride resin particles (A) should be 800 to 4,000, especially 900 to 3,000. If the polymerization degree is outside the above-mentioned range, the processability and mechanical properties of the coating are degraded.

The vinyl chloride resin particles (A) used in the present invention are prepared by emulsion-polymerizing or suspension-polymerizing vinyl chloride alone or in combination with a minute amount of a comonomer such as butadiene, styrene or vinyl acetate. The particle size of the vinyl chloride resin particles (A) is ordinarily 0.01 to 10 microns and especially 0.02 to 5 microns.

The solvent-soluble vinyl chloride/vinyl acetate/carboxyl group- or hydroxyl group-containing vinyl unit copolymer (B) contained in the coating composition of the present invention has a function of prominently increasing the adhesion to the metal substrate because it contains polar groups such as carboxyl groups or hydroxyl groups. Furthermore, since the copolymer (B) contains vinyl chloride units, the heat bonding to the copolyester adhesive is enhanced by the copolymer (B). Moreover, since the copolymer (B) contains vinyl acetate units, it gives an excellent processability and a good plasticity to the coating. Still further, in the coating composition of the present invention, the copolymer (B) exerts a function of stabilizing the dispersion of the vinyl chloride resin particles (A), and in the coating formed by baking, the copolymer (B) exerts a function of integrating and homogenizing the respective components.

It is important that the solvent-soluble copolymer (B) should be present in an amount of 10 to 80% by weight, especially 10 to 60% by weight, based on solids in the coating composition. If the amount of the copolymer (B) is below the above-mentioned range, the above advantages are not attained, and if the amount of the copolymer (B) exceeds the above range, the processability, creep resistance and other mechanical properties of the coating are reduced.

It also is important that the solvent-soluble copolymer (B) should contain carboxyl groups and/or hydroxyl groups at a concentration of 5 to 500 millimoles, preferably 10 to 300 millimoles, per 100 g of the resin. If the concentration is lower than 5 millimoles/100 g of the resin, peeling is liable to occur between the metal substrate and the coating, and if the concentration is higher than 500 millimoles per 100 g of the resin, the water resistance of the coating is reduced and the corrosion resistance is lost.

It is preferred that the vinyl chloride units be present in an amount of 50 to 95% by weight based on the copolymer (B) and the vinyl acetate units be present in an amount of 2 to 40% by weight based on the copolymer (B). It also is preferred that the polymerization degree of the copolymer (B) be 80 to 1500 and the molecular weight of the copolymer (B) be smaller than that of the vinyl chloride resin particles (A).

As preferred examples of the vinyl chloride copolymer (B), there can be mentioned a saponified vinyl chloride/vinyl acetate copolymer, a vinyl chloride/vinyl acetate/acrylic acid copolymer, a partially saponified and partially butylated vinyl chloride/vinyl acetate copolymer, a vinyl chloride/vinyl acetate/methacrylate acid copolymer, a vinyl chloride/vinyl acetate/maleic anhydride copolymer, a vinyl chloride/vinyl acetate/hydroxyethyl acrylate copolymer, a vinyl chloride/vinyl acetate/hydroxyethyl methacrylate copolymer and a saponified vinyl chloride/vinyl acetate/acrylic acid copolymer.

Since the solvent-soluble thermosetting resin (C) contained in the coating composition of the present invention has a reactivity with carboxyl groups or hydroxyl groups, it exerts auxiliary functions of giving a curability to the formed coating and improving the adhesion of the coating to the metal substrate.

When an epoxy group-containing resin is used as one component of the thermosetting resin (C), the thermal stability of the vinyl chloride resin particles (A) and the vinyl chloride copolymer (B) is prominently improved. Various heat stabilizers for vinyl chloride resins are known, but these heat stabilizers are defective in that they bleed out to the surface of the coating or into the interface between the coating and the metal blank, resulting in reduction of the adhesive force or bonding force, and they migrate into the content to degrade hygienic characteristics. In contrast, if an epoxy group-containing thermosetting resin is used, since this resin is coupled with other resin and produces a heat stabilizing effect in the crosslinked state, the above defects are effectively eliminated.

Furthermore, if a phenol-formaldehyde resin is used as one component of the thermosetting resin (C), a strong bonding can be obtained with a polyamide type adhesive.

An epoxy resin derived bisphenol A and epichlorohydrin is preferred as the epoxy resin, and it is preferred that the molecular weight of this epoxy resin be 250 to 4000, especially 300 to 1500, and that the epoxy equivalent of the epoxy resin be 180 to 3500, especially 200 to 1500. In order to attain the objects of the present invention, it is preferred that an epoxy resin and a phenolic resin or amino resin be used as a weight ratio of from 95/5 to 20/80. The thermosetting resin may be modified with a drying oil, a semi-drying oil, rosin, rosin ester or the like.

It also is important that the thermosetting resin (C) should be used in an amount of 2 to 30% by weight, especially 5 to 20% by weight, based on solids. If the amount of the thermosetting resin (C) is below the above range, no satisfactory results can be obtained in connection with the curability, adhesion and heat stability, and if the amount of the thermosetting resin (C) exceeds the above range, excellent advantages of the vinyl chloride type coating composition are lost.

In the coating composition of the present invention, the copolymer (B) and thermosetting resin (C) are present in a continuous phase as the dispersing medium and the vinyl chloride resin particles (A) are present as the dispersed phase dispersed in the continuous phase. By dint of this characteristic feature, this coating composition can be coated at a high solid concentration and thick coating can be performed.

The coating composition of the present invention can be prepared by dissolving the vinyl chloride resin in an aromatic hydrocarbon solvent such as toluene or xylene, a ketone solvent such as acetone, methylethyl ketone, methylisobutyl ketone or cyclohexanone, an alcohol solvent such as ethanol, propanol or butanol, a cellosolve type solvent such as ethyl cellosolve or butyl cellosolve, an ester type solvent such as ethyl acetate or butyl acetate, or a mixture of two or more of the foregoing solvents. In case of a three-component type coating composition, components (B) and (C) are dissolved in a solvent such as mentioned above and the vinyl chloride resin particles (A) are dispersed in the solution.

The coating composition having a viscosity suitable for the coating operation with a solid concentration of 10 to 70% by weight is coated on a metal blank. The coating operation can be performed according to optional coating means, such as roller coating, brush coating, doctor coating, spray coating, electrostatic coating and dip coating. In order to attain the objects of the present invention, it is preferred that the amount of the primer coated on the metal substrate be 0.5 to 30 g/m$^2$, especially 1 to 20 g/m$^2$, on the dry basis. The coated metal blank is heated at 150° to 350° C. for 5 seconds to 30 minutes in a hot air furnace or an infrared ray heating furnace to effect baking and obtain an intended coating.

The resulting baked coating is a substantially homogeneous, integrated and compact coating. It is preferred that the coating should have a glass transition temperature (Tg) of at least 40° C., especially at least 60° C. In this connection, it is required that the vinyl chloride resin coating of the present invention should be free of a plasticizer or if a plasticizer is contained, the amount of the plasticizer should be so small that the glass transition temperature is not lower than 40° C. Furthermore, since the vinyl acetate units included in the vinyl chloride resin are liable to reduce the glass transition temperature, it is important that the vinyl acetate units should be included in the vinyl chloride resin so that the glass transition temperature is maintained at a level not lower than 40° C.

Known additives may be incorporated into the vinyl chloride resin. For example, a plasticizer such as dioctyl phthalate or epoxidized soybean oil may be used in an amount satisfying the above requirement. Furthermore, a heat stabilizer such as calcium stearate zinc stearate, an organic tin compound or an organic phosphoric acid ester, a lubricant such as a microcrystalline wax or a higher fatty acid amide, a filler such as calcium carbonate or calcined clay, and a pigment such as titanium oxide, zinc oxide or aluminum powder may be incorporated according to known recipes.

A seamless cup is obtained by punching the above-mentioned coated metal blank into a disc or the like, subjecting the disc or the like to one-staged or multi-staged drawing processing between a drawing punch and a drawing die, and if desired, subjecting the drawn cup to multi-staged ironing processing between an ironing punch and an ironing die. Known drawing processing and ironing processing procedures and conditions may be adopted.

The thickness of the coated metal blank to be subjected to the above-mentioned processing is changed according to the final dimension of the vessel or the kind of the metal blank, but it is preferred that the thickness of the metal blnak be 0.1 to 0.5 mm, especially 0.2 to 0.35 mm. In the case where the ironing processing is carried out, it is preferred that the thickness of the side wall be 0.05 to 0.20 mm, especially 0.06 to 0.17 mm.

In the present invention, it is preferred that a cup-shaped molded body be prepared by subjecting a coated metal blank to draw forming or draw-redraw (deep draw) forming. However, there may be adopted a method in which an uncoated metal blank is subjected to draw-ironing processing to form a cup-shaped molded body and this cup-shaped molded body is coated with a vinyl chloride resin coating composition as mentioned above.

The copolyester adhesive of the present invention may be in the form of a single copolyester, a blend of copolyesters, a blend of a copolyester with a homopolyester or a blend of a copolyester or the above blend with other thermoplastic resin, so far as the adhesive is composed mainly of a copolyester containing in the main chain at least 50 mole %, based on the acid component, of terephthalic acid, at least 50 mole %, based on the alcohol component, of 1,4-butane diol and at least 1 mole % of at least one member selected from other acids and alcohols.

As the acid other than terephthalic acid, there can be mentioned isophthalic acid, naphthalene-dicarboxylic acid, diphenyl-dicarboxylic acid, diphenylmethane-dicarboxylic acid, adipic acid, sebacic acid, maleic acid, fumaric acid, succinic acid hexahydroterephthalic acid. As the alcohol other than 1,4-butane-diol, there can be mentioned ethylene glycol, propylene glycol, neopentyl glycol, diethylene glycol, triethylene glycol, cyclohexane-diol and xylene glycol.

From the viewpoint of mechanical properties, it is important that the copolyester should have a sufficiently high molecular weight, for example, ordinarily a number average molecular weight of at least 6000 and especially a number average molecular weight of 9000 to 500,000. From the viewpoint of creep resistance, it is preferred that the copolyester should have a crystallinity of 3 to 45%, especially 5 to 40%, as determined according to the density method. Furthermore, from the viewpoint of the adaptability to the heat bonding operation, it is preferred that the melting point of the copolyester be 80° to 280° C., especially 90° to 240° C.

The copolyester may be used singly or a blend of two or more copolyesters included within the scope of the present invention may be used. Furthermore, the copolyester of the present invention may be used in the form of a blend with other thermoplastic resin, for example, an olefin resin such as polyethylene, polypropylene, an ethylene-propylene copolymer, an ethylene-butene-1 copolymer, an ion-crosslinked olefin copolymer (ionomer), an ethylene-vinyl acetate copolymer, an ethylene-acrylic acid copolymer, acid-modified polyethylene or acid-modified polypropylene. Of course, the olefin resin is used in an amount of up to 50% by weight, especially up to 30% by weight, based on the total amount of the adhesive.

The adhesive of the present invention is applied to open ends of cups to be bonded prior to fitting of the cups. It is preferred that the adhesive be applied so that the thickness of the resin layer is 10 to 200 μm, especially 20 to 150 μm, and the width of the lap-bonded portion, that is, the lap width, is 1 to 30 mm, especially 2 to 20 mm.

The adhesive resin may be applied to the open ends of the cups in the form of a film, a powder, a slurry, a solution, a plastisol or an emulsion. The adhesive of the present invention is advantageous in that the adhesive can be applied in the form of a film which can be handled and coated very easily and has good adaptability to drying or the like.

The adhesive may be applied by an optional method selected according to the form of the adhesive. For example, there may be adopted a lamination method, an extrusion method, an electrostatic powder coating method, an electrostatic deposition method, a spray coating method, a nozzle injection method, a dip coating method, a roll coating method and a brush coating method.

The portion to be bonded of the metal blank is coated with the above-mentioned coating composition, and this coating composition acts as a primer and a desirable bondability is obtained.

When the circumferential open ends of the cups are lap-bonded, the cut edge of the metal blank is inevitably exposed on the inner side of the seam. This cut edge can be protected by wrapping the cut edge with a tape of the adhesive or applying a powder, slurry or solution of the adhesive to the cut edge prior to fitting of the cups.

The adhesive may be applied to the outer surface and/or inner surface of the open end of the cup to be located on the inner or outer side of the seam.

The adhesive-applied cup is fitted with the other cup, and the adhesive present in the portion to be lap-bonded is melted, if necessary, followed by cooling, whereby a seam is formed. The heating of the portion to be lap-bonded can be accomplished by high frequency induction heating, infrared ray heating, hot air heating and heat conduction from a heating member. The cooling of the seam may be accomplished by optional means such as natural cooling, air cooling and water cooling.

In order to form a seam excellent in air tightness and bonding force, it is preferred that the adhesive be melted in the state where the adhesive layer is pressed and gripped between the open end to be located on the outer side of the seam and the open end to be located on the inner side of the seam. It is ordinarily preferred that the following relation be established among the dimensions of both the open ends to be formed into a circular lap-bonded portion and the adhesive layer:

$$D_O - D_I < 2d_A$$

wherein $D_I$ stands for the outer diameter of the open end located on the inner side, $D_O$ stands for the inner diameter of the open end located on the outer side, and $d_A$ stands for the thickness of the adhesive layer, and that the thickness of the adhesive layer after heat bonding be 10 to 150 μm, especially 10 to 100 μm.

The above-mentioned bottle-like metal vessel is especially valuable as a vessel for a content having a spontaneous pressure, such as carbonated drink, beer or frothed spirit or an inner pressure vessel in which a content is packed together with nitrogen gas or liquefied nitrogen.

The present invention will now be described in detail with reference to the following Examples that by no means limit the scope of the invention.

Preparation of Coating Composition

Coating compositions used in the Examples were prepared by dissolving and/or dispersing the following components (1) through (6) in amounts indicated in Table 1 so that the non-volatile component content was 25% by weight.

(1) Vinyl Chloride Resin:

QYNV-2 (vinyl resin supplied by Union Carbid Corporation)

(2) Vinyl Chloride Copolymer Resin:

An autoclave was charged with 300 ml of water containing 0.6 g of polyvinyl alcohol having a hydrolysis ratio of 80%, 0.15 g of azobisisobutyronitrile and 10 g of monomeric vinyl acetate, and the charge was cooled to −20° C. in a dry ice-methanol bath. Then, 90 g of liquid vinyl chloride monomer was promptly added to the charge, and the temperature was elevated to 58° C. and polymerization was carried out with stirring for 3 hours to obtain a polymer having a polymerization degree of 325 and a vinyl chloride/vinyl acetate weight ratio of 91/9 (the polymer was designated as "V-1").

Vinyl chloride/vinyl acetate copolymers having a polymerization degree of 310 and a vinyl chloride/vinyl acetate weight ratio of 87/13 (V-2) and a polymerization degree of 290 and a vinyl chloride/vinyl acetate weight ratio of 80/20 (V-3), respectively, were synthesized in the same manner as described above.

Furthermore, a vinyl chloride/vinyl acetate/maleic anhydride terpolymer having a polymerization degree of 295 and a vinyl chloride/vinyl acetate/maleic anhydride weight ratio of 86/10/3 (V-4) was synthesized in the same manner as described above.

The vinyl chloride/vinyl acetate copolymers V-1 and V-3 were partially saponified with an alkali to obtain a vinyl chloride/vinyl acetate/vinyl alcohol copolymer having a polymerization degree of 325 and a vinyl chloride/vinyl acetate/vinyl alcohol weight ratio of 91/3/6 (V-5) and a vinyl chloride/vinyl acetate/vinyl alcohol copolymer having a polymerization degree of 290 and a vinyl chloride/vinyl acetate/vinyl alcohol weight ratio of 80/5/15(V-6).

(3) Epoxy Resin:

Epon 828 (bisphenol A type epoxy resin supplied by Shell Chemicals; average molecular weight=380 and epoxy equivalent=184–194)

(4) Amino Resin:

Beckamine P-138 (butyl-etherified urea resin supplied by Dai-Nippon Ink)

(5) Phenolic Resin:

In 1.5 moles of 37% aqueous formaldehyde were dissolved 0.5 mole of carbolic acid and 0.5 mole of p-cresol, and 0.15 mole of ammonia was added as a catalyst and reaction was carried out at 95° C. for 3 hours. The reaction product was extracted with a mixed solvent of ketone, alcohol and hydrocarbon, and the extract was washed with water and the water layer was removed. A small amount of remaining water was removed by azeotropic distillation. The residue was cooled to obtain a 30% solution of a resol type phenolic resin.

(6) Plasticizer

Epoxidized soybean oil

The final vinyl chloride unit content of each coating composition, the concentration of carboxyl groups and/or hydroxyl groups determined from the characteristic infrared absorptions of carboxyl groups and hydroxyl groups according to the calibration method and the glass transition temperature as determined according to the TMA method at a heating rate of 5° C./min are shown in Table 3.

TABLE 1

| Coating Composition Code | Composition (% by weight) | | | | | | | | |
|---|---|---|---|---|---|---|---|---|---|
| | Vinyl Chloride Resin | Vinyl Chloride Copolymer Resin | | | | Other Resins | | | Plasticizer |
| | | V-2 | V-4 | V-5 | V-6 | Epoxy Resin | Amino Resin | Phenolic Resin | |
| E1 | | 50 | | 30 | | 10 | | 10 | |
| E2 | 70 | | 30 | | | | | | |
| E3 | 85 | | | | | 15 | | | |
| E4 | | 60 | | | 40 | | | | |
| E5 | 70 | | | | | 20 | | | 10 |
| E6 | | 40 | 30 | | | 20 | 10 | | |
| E7 | | | | 60 | | 20 | | 20 | |
| E8 | | | 50 | | | 20 | 20 | | 10 |
| E9 | | | | | 40 | 30 | 15 | | 15 |
| E10 | 80 | | | 20 | | | | | |
| E11 | | | 30 | | | 35 | 20 | | 15 |
| E12 | | 95 | | 5 | | | | | |
| E13 | | | | | 70 | | 30 | | |
| E14 | 60 | | | | | 10 | | | 30 |

Note
V-2: vinyl chloride/vinyl acetate weight ratio = 87/13, polymerization degree = 310
V-4: vinyl chloride/vinyl acetate/maleic anhydride weight ratio = 86/10/3, polymerization degree = 295
V-5: vinyl chloride/vinyl acetate/vinyl alcohol weight ratio = 91/3/6, polymerization degree = 325
V-6: vinyl chloride/vinyl acetate/vinyl alcohol weight ratio = 80/5/15, polymerization degree = 290

PREPARATION OF COPOLYESTER ADHESIVE

Copolyesters or adhesives composed mainly of copolyesters, which were used in the following Examples, were prepared according to the following procedures.

Predetermined acid and glycol components were charged in a glass reaction vessel together with a catalyst such as tetra-n-butyl titanate in an amount of about 0.04% by weight, and the mixture was heated at 200° C. with stirring and reaction was continued for about 100 minutes while removing methanol formed by the reaction. Then, the temperature was elevated to about 260° C. and polymerization was carried out for about 2 hours under a reduced pressure of 0.1 to 0.5 mmHg. The obtained copolyester was pelletized, inserted between two Teflon sheets and hot-pressed at a temperature higher by 20° to 30° C. than the melting point or softening point of the resin to obtain a filmy sheet having a thickness of about 80 μm. The final composition of each sample was confirmed by the proton NMR analysis and gas chromatography. The compositions determined from the analysis results are shown in Table 2.

The polymerization degree was changed according to the polymerization conditions and the composition of the copolyester, but the obtained copolyesters were found to have a number average molecular weight of about 15,000 to 35,000.

Blend samples B-1 and B-2 were prepared by using Surlyn 1706 as an ionomer, separately prepared polyethylene terephthalate (having a number average molecular weight of about 18,000) and separately prepared polyethylene terephthalate/isophthalate (composition ratio of 70/30) (having a number average molecular weight of about 16,000), respectively, mixing both the resins in a high temperature kneader at about 240° C. or about 270° C. in a nitrogen atmosphere and pelletizing the mixtures.

TABLE 2

| Adhesive Code | Adhesive Composition | | | |
|---|---|---|---|---|
| | Acid Component(mole %) | | Alcohol Component(mole %) | |
| | Terephthalic Acid T | Other Acid | 1,4-Butane-Diol B | Other Alcohol |
| C1 | 80 | A(10), S(10) | 90 | PE[350](10) |
| C2 | 70 | I(30) | 100 | — |
| C3 | 100 | — | 65 | PE[800](35) |
| C4 | 85 | A(15) | 80 | E(10), PE[350](10) |
| C5 | 90 | S(10) | 60 | P(30), E(10) |
| C6 | 55 | O(25), A(20) | 80 | PE[500](20) |
| C7 | 95 | Az(5) | 80 | P(10), PE[350](10) |
| C8 | 90 | Az(10) | 95 | TE(5) |
| C9 | 50 | O(25), I(25) | 55 | N(35), P(10) |
| B1* | 85 | I(10), A(5) | 85 | E(10), PE[500](5) |
| B2** | 65 | I(35) | 100 | — |
| C10 | 30 | I(70) | 100 | — |
| C11 | 85 | A(15) | 30 | E(70) |
| C12 | 0 | S(50), A(50) | 80 | N(20) |
| C13 | 85 | Az(15) | 0 | E(100) |
| C14 | 100 | — | 100 | — |

Note
Acid Component:
I: isophthalic acid
A: adipic acid
S: sebacic acid
O: orthophthalic acid
Az: azelaic acid
Alcohol Component:
E: ethylene glycol
P: propylene glycol
N: neopentyl glycol
TE: triethylene glycol
PE [ ]: polyethylene glycol [number average molecular weight]
Each parenthesized value indicates the ratio (mole %) of the indicated component.
*blend of 80% by weight of the copolyester and 20% by weight of the ionomer
**blend of 50% by weight of the copolyester, 30% by weight of polyethylene terephthalate/isophthalate (70/30) and 20% by weight of polyethylene terephthalate In the following Examples, metal vessels were evaluated according to the following methods.

EVALUATION OF METAL VESSEL (a) Measurement of Shear Strength of Bonded Portion:

Each of the bonded metal vessel and the metal vessel filled with water was allowed to stand still at 70° C. for 10 hours, and a specimen containing a bonded portion having a length of 7 cm in the direction of the height and a length of 2 cm in the circumferential direction was taken out from the metal vessel. The shear fracture test was carried at a tensile speed of 100 mm/min at room temperature by using a Tensilon tester, and the shear strength was determined while taking the bonded area of the lap-bonded portion into consideration. With respect to each sample, three vessels were tested, and the arithmetic mean value was calculated. In the Tables, in a sample having a strength of more than 53 to 58 Kg/cm$^2$, fracture was caused in the plates, and the actual strength was higher than the indicated value.

(b) Measurement of Peel Strength of Bonded Portion:

Each of the bonded metal vessel and the metal vessel filled with water was allowed to stand still at 70° C. for 10 hours. A circumferential specimen was cut out from the metal vessel, and the T-peel fracture test was carried out at a tensile speed of 200 m/min at room temperature by using a Tensilon tester. With respect to each sample, three vessels were tested, and the average peel strength was determined while the width of the lap-bonded portion was taken into consideration. The main fracture mode was classified as I (coating-plate interface), II (coating-adhesive interface), III (adhesive) or IV (coating) by the visual observation.

Figure 4:
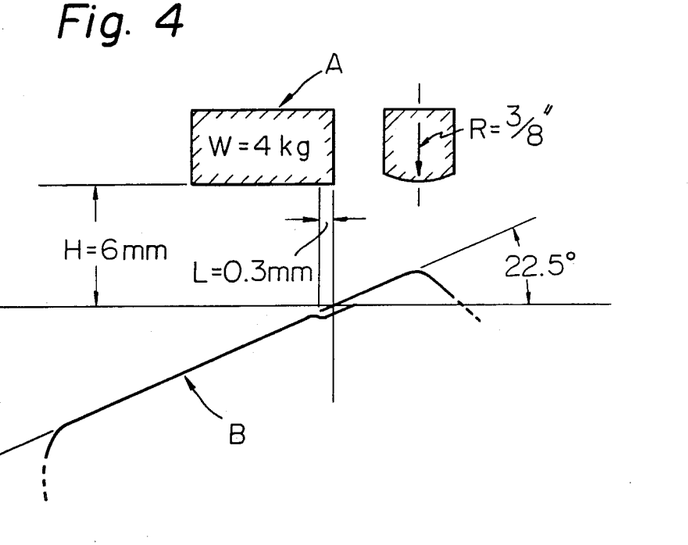
FIG. 4 is a view diagrammatically illustrating the denting test.

(c) Denting Test:

The metal vessel was filled with a predetermined content, and as shown in FIG. 4, a 4-Kg weight A was dropped from a predetermined height (6 mm) vertically on the metal vessel B at a point 0.3 mm apart from the end edge of the outer member in the bonded portion, while the metal vessel B was inclined at an angle of 22.5° to the horizontal direction.

The vessel in which the upper member was separated from the lower member or a gap was formed in the bonded portion at this test was designated as "broken barrel", and the vessel in which the inner pressure measured after 48 hours' standing at 23° C. was lower by more than 5% than the inner pressure measured just after filling or bleeding of the content was observed in the vicinity of the bonded portion was designated as "leakage". In the Tables, the leakage ratio (%) of the number of the leakage vessels and broken barrel vessels to the total number of the tested vessels is shown. Incidentally, parenthesize value in Tables indicates the broken barrel ratio (%) of the number of the broken barrel vessels to the total number of the tested vessels.

The test temperature was adjusted to 0° or 25° C. After it was confirmed that the temperature of the entire vessel structure arrived at this level, the test was carried out. Incidentally, with respect to each sample, 50 vessels were tested.

(d) Falling Test:

Metal vessels were filled with a predetermined content, and the vessels were dropped at room temperature from a height of 90 cm so that (i) the bottom was located on the lower side (25 bottles) or (ii) the bonded portion was located on the lower side (25 bottles). The broken barrel was checked, and leakage was checked after 48 hours' standing. In the Tables, the leakage ratio (%) of the number of the broken barrel and leakage vessels to the total number of the tested vessels is shown, and the parenthesized value indicates the broken barrel ratio (%) of the number of the broken barrel vessels to the total number of the tested vessels.

(e) Storage Test at 50° C. for 3 Months:

(i) Volume Change:

The total volume of the vessel before filling was measured, and the vessel was filled with a content. After the lapse of a predetermined period, the total volume was measured again when no leakage was observed, and the difference between the two measured volumes was designated as the volume change ΔV. With respect to each sample, 10 vessels were tested and the arithmetic mean value was calculated.

(ii) Leakage Ratio and Broken Barrel Ratio:

The vessel in which the upper member was separated from the lower member or a gap was formed in the bonded portion by deformation of the upper or lower member was designated as "broken barrel". The vessel in which the inner pressure measured at 25° C. was lower by more than 5% than the inner pressure measured just after filling and bleeding of the content was observed in the vicinity of the bonded portion was designated as "leakage". With respect to each sample, 50 bottles were tested. In tables, the leakage ratio (%) of the number of the broken barrel vessels and leakage vessels to the total number of the tested vessels is shown, and the parenthesized value indicates the broken barrel ratio (%) of the number of the broken barrel vessels to the total number of the tested vessels.

(iii) Dissolution of Metal:

A metal vessel was filled with synthetic carbonated drink, and the metal vessel was allowed to stand at a predetermined temperature for a predetermined time and the amount of the dissolved metal was measured by the atomic extinction method. With respect to each sample, 10 vessels were tested, and the arithmetic mean value was calculated.

EXAMPLES 1 THROUGH 8 AND COMPARATIVE EXAMPLES 1 THROUGH 5

Inner and outer surfaces of an aluminum plate (3004, H19 chromate treated) having a thickness of 0.23 mm were coated with a coating composition shown in Table 1 so that the amounts coated were 180 mg/dm$^2$ and 80 mg/dm$^2$, respectively. The coatings were baked. The coated aluminum plate was punched into a disc having a diameter of 250 mm The disc was subjected to ordinary press forming to obtain an upper member in which the inner diameter of the end edge of the portion to be bonded was 110.6 mm and a pouring opening having a diameter of 30 mm was formed at the center.

A disc having a diameter of 250 mm was punched out from the same coated plate, and the disc was subjected to ordinary press forming to obtain a lower member in which the outer diameter of the end edge of the portion to be bonded was 110.6 mm.

The adhesive was coated along the entire circumference of the end edge of the lower member according to the method described below so that the adhesive-applied width was about 5.5 mm on the outer surface side and about 1.5 mm on the inner surface side. More specifically, an adhesive film having a composition and properties shown in Table 2 (Cl having a terphthalic acid content of 80 mole % based on the acid component and a 1,4-butane-diol content of 90 mole % based on the glycol component), which had a thickness of 80 μm and a width of 7 mm, was applied to the entire circumference of the end edge of the outer surface of the lower member heated in advance by high frequency induction heating, so that the adhesive film was protruded from the end edge along a length of about 1.5 mm. The protruded portion of the film was folded back and was applied to the inner surface of the cut edge of the lower member while heating it again by high frequency induction heating, whereby a lower member having the end edge covered with the adhesive was prepared.

The upper member was fitted with the adhesive-applied lower member, and the fitted portion was heated by high frequency induction heating to melt the adhesive, and the adhesive was then solidified by cooling to obtain a metal vessel having a capacity of about 2 liters, which comprised the bonded upper and lower members.

The strength of the bonded portion of the metal vessel was evaluated. Separately, beer was filled in the metal vessel and the pouring opening was plugged. Sterilization was carried out at 65° C. for 30 minutes and the packed vessel was allowed to stand at 50° C. The change of the inner volume, leakage and breakage of the barrel were checked. Furthermore, the denting test and falling tests were carried out, and leakage and breakage of the barrel were checked. The obtained results are shown in Table 3.

TABLE 3

| | Coating Composition Code | Vinyl Chloride Unit Content (% by weight) | Carboxyl Group and/or Hydroxyl Group Concentration (millimoles per 100 g of resin) | Glass Transition Temperature (°C.) | Strength of Bonded Portion | | | |
|---|---|---|---|---|---|---|---|---|
| | | | | | Shear Strength (kg/cm$^2$) | | Peel Strength (kg/cm) | |
| | | | | | just after bonding | after standing at 70° C. | just after bonding | after standing at 70° C. |
| Example 1 | E2 | 95.8 | 15.5 | 80 | >54 | >54 | 3.5(I) | 3.0(I) |
| Example 2 | E3 | 85.0 | 52.8 | 91 | >55 | >56 | 5.8(I) | 4.5(I) |
| Example 3 | E4 | 84.2 | 136.4 | 75 | >58 | >56 | 7.8(I) | 5.2(I) |
| Example 4 | E5 | 70.0 | 70.4 | 68 | >55 | >54 | 6.7(I) | 4.7(I) |
| Example 5 | E6 | 60.6 | 225.9 | 90 | >56 | >57 | 7.5(I) | 5.0(I) |
| Example 6 | E7 | 54.6 | 382.2 | 95 | >56 | >54 | 6.2(I) | 4.5(I) |
| Example 7 | E8 | 43.0 | 376.3 | 65 | >57 | >54 | 5.2(II) | 3.9(II) |
| Example 8 | E9 | 32.0 | 452.0 | 58 | >54 | 53 | 4.3(II) | 2.0(IV) |
| Comparative Example 1 | E10 | 98.2 | 27.3 | 83 | >54 | >54 | 2.5(IV) | 2.0(IV) |
| Comparative Example 2 | E11 | 25.8 | 408.4 | 62 | 45 | 38 | 2.0(II) | 1.7(II) |
| Comparative Example 3 | E12 | 87.2 | 6.8 | 73 | 38 | 15 | 1.5(I) | 0.8(I) |
| Comparative Example 4 | E13 | 56.0 | 658.6 | 91 | >54 | 25 | 3.8(IV) | 1.2(IV) |
| Comparative Example 5 | E14 | 60.0 | 35.2 | 20 | 30 | 8 | 3.4(IV) | 0.6(IV) |

| | Leakage Ratio (Broken Barrel Ratio) (%) at Denting Test | | Leakage Ratio (Broken Barrel Ratio)(%) at Falling Test | | After Standing at 50° C. for 3 Months | | |
|---|---|---|---|---|---|---|---|
| | (4 kg, h = 6 mm) | | | | Volume Change | Leakage Ratio (Broken | Dissolution (ppm) |
| | 0° C. | 25° C. | methods (i) | method (ii) | ΔV (ml) | Barrel Ratio)(%) | of Metal (Aluminum) |
| Example 1 | 0 | 0 | 0 | 0 | 0.4 | 0 | 3.8 |
| Example 2 | 0 | 0 | 0 | 0 | 0.7 | 0 | 0.5 |
| Example 3 | 0 | 0 | 0 | 0 | 0.3 | 0 | 0.2 |
| Example 4 | 0 | 0 | 0 | 0 | 0.6 | 0 | 0.2 |
| Example 5 | 0 | 0 | 0 | 0 | 0.2 | 0 | 0.3 |
| Example 6 | 0 | 0 | 0 | 0 | 0.6 | 0 | 2.3 |
| Example 7 | 0 | 0 | 0 | 0 | 0.9 | 0 | 3.0 |
| Example 8 | 0 | 0 | 0 | 0 | 0.8 | 0 | 3.4 |
| Comparative Example 1 | 10(0) | 10(0) | 0 | 0 | 1.0 | 0 | 9.6 |
| Comparative Example 2 | 30(0) | 20(0) | 4(4) | 8(8) | 8.2 | 32(14) | 8.4 |
| Comparative Example 3 | 80(6) | 70(4) | 24(20) | 28(20) | 18.5 | 54(32) | 2.5 |
| Comparative Example 4 | 8(0) | 4(0) | 0 | 0 | 4.3 | 30(10) | 3.8 |
| Comparative Example 5 | 2(0) | 2(0) | 0 | 0 | 23.2 | 82(72) | 7.3 |

EXAMPLES 9 THROUGH 18 AND COMPARATIVE EXAMPLES 6 THROUGH 10

The inner and outer surfaces of an aluminum plate (3004, H19 chromate-treated) having a thickness of a modified vinyl coating composition E1 (vinyl chloride unit content=70.8% by weight, hydroxyl group concentration=191.1 moles/100 g of resin, Tg=88° C.: see table 1) so that the amounts coated were 180 mg/dm$^2$ and 80 mg/dm$^2$, respectively, were baked.

The coated aluminum plate was punched into a disc having a diameter of 250 mm. The disc was subjected to ordinary press forming to obtain an upper member in which the inner diameter of the end edge of the portion to be bonded was 110.6 mm and a pouring opening having a diameter of 30 mm was formed at the center.

A disc having a diameter of 250 mm was punched out from the same coated plate, and the disc was subjected to ordinary press forming to obtain a blower member in which the outer diameter of the end edge of the portion to be bonded was 110.6 mm.

The adhesive was coated along the entire circumference of the end edge of the lower member according to the method described below so that the adhesive-applied width was about 5.5 mm on the outer surface side and about 1.5 mm on the inner surface side. More specifically, an adhesive film having a composition and properties shown in Table 2, which had a thickness of 80 μm and a width of 7 mm, was applied to the entire circumference of the end edge of the outer surface of the lower member heated in advance by high frequency induction heating, so that the adhesive film was protruded from the end edge along a length of about 1.5 mm. The protruded portion of the film was folded back and was applied to the inner surface of the cut edge of the lower member while heating it again by high frequency induction heating, whereby a lower member having the end edge covered with the adhesive was prepared.

The upper member was fitted with the adhesive-applied lower member, and the fitted portion was heated by high frequency induction heating to melt the adhesive, and the adhesive was then solidified by cooling to obtain a metal vessel having a capacity of about 2 liters, which comprised the bonded upper and lower members.

The strength of the bonded portion of the metal vessel was evaluated. Separately, beer was filled in the metal vessel and the pouring opening was plugged. Sterilization was carried out at 65° C. for 30 minutes and the packed vessel was allowed to stand at 50° C. The change of the inner volume, leakage and breakage of the barrel were checked. Furthermore, the denting test and falling tests were carried out, and leakage and breakage of the barrel were checked. The obtained results are shown in Table 4. Furthermore, the content of terephthalic acid in the acid component and the content of 1,4-butane-diol in the glycol component in the copolyester adhesive are shown in Table 4.

to be bonded was 64.48 mm and a pouring opening having a diameter of 25 mm was formed at the center.

Separately, a tin-deposited steel plate having a thickness of 0.30 mm was punched into a disk having a diameter of about 142 mm and the disk was formed into a cup having an inner diameter of about 85 mm between a drawing punch and a drawing die. Then, the cup was subjected to the re-drawing processing and was ironed by ironing punch and die having a diameter of about

TABLE 4

| | | Adhesive Copolyester | | Strength of Bonded Portion | | | |
|---|---|---|---|---|---|---|---|
| | | | | Shear Strength (Kg/cm$^2$) | | Peel Strength (kg/cm) | |
| | Code | Terephthalic Acid Content (mole %) | 1,4-Butane-Diol Content (mole %) | just after bonding | after standing at 70° C. | just after bonding | after standing at 70° C. |
| Example 9 | C2 | 70 | 100 | >57 | >56 | 7.0(I) | 5.0(I) |
| Example 10 | C3 | 100 | 65 | >58 | >56 | 7.3(I) | 3.8(II) |
| Example 11 | C4 | 85 | 80 | >55 | >56 | 7.4(I) | 4.4(I) |
| Example 12 | C5 | 90 | 60 | >56 | >57 | 7.5(I) | 4.5(I) |
| Example 13 | C6 | 55 | 80 | >54 | >55 | 6.5(I) | 4.2(I) |
| Example 14 | C7 | 95 | 80 | >58 | >57 | 6.8(I) | 4.6(I) |
| Example 15 | C8 | 90 | 95 | >57 | >56 | 7.2(I) | 4.8(I) |
| Example 16 | C9 | 50 | 55 | >55 | >56 | 6.6(I) | 3.4(II) |
| Example 17 | B1 | 85 | 85 | >57 | >56 | 5.2(III) | 4.4(I) |
| Example 18 | B2 | 65 | 100 | >55 | >58 | 4.8(III) | 4.6(III) |
| Comparative Example 6 | C10 | 30 | 100 | >55 | 50 | 4.4(I) | 2.2(II) |
| Comparative Example 7 | C11 | 85 | 30 | >57 | >55 | 1.7(III) | 1.2(II) |
| Comparative Example 8 | C12 | 0 | 80 | 46 | 27 | 1.5(III) | 0.8(II) |
| Comparative Example 9 | C13 | 85 | 0 | 53 | 17 | 1.2(II) | 0.4(II) |
| Comparative Example 10 | C14 | 100 | 100 | >57 | >56 | 4.0(III) | 2.5(III) |

| | Leakage Ratio (Broken Barrel Ratio)(%) at Denting Test (4 kg, h = 6 mm) | | Leakage Ratio (Broken Barrel Ratio)(%) at Falling Test | | After Standing at 50° C. for 3 Months | |
|---|---|---|---|---|---|---|
| | 0° C. | 25° C. | method(i) | method (ii) | Volume Change ΔV (ml) | Leakage Ratio (Broken Barrel Ratio)(%) |
| Example 9 | 0 | 0 | 0 | 0 | 0.4 | 0 |
| Example 10 | 0 | 0 | 0 | 0 | 1.1 | 0 |
| Example 11 | 0 | 0 | 0 | 0 | 0.2 | 0 |
| Example 12 | 0 | 0 | 0 | 0 | 0.6 | 0 |
| Example 13 | 0 | 0 | 0 | 0 | 0.8 | 0 |
| Example 14 | 0 | 0 | 0 | 0 | 0.3 | 0 |
| Example 15 | 0 | 0 | 0 | 0 | 0.2 | 0 |
| Example 16 | 4(0) | 2(0) | 0 | 0 | 0.7 | 0 |
| Example 17 | 0 | 0 | 0 | 0 | 1.0 | 0 |
| Example 18 | 2 | 0 | 0 | 0 | 0.4 | 0 |
| Comparative Example 6 | 2(0) | 2(0) | 0 | 4(0) | 15.0 | 6(6) |
| Comparative Example 7 | 6(0) | 2(0) | 4(4) | 4(0) | 4.0 | 14(10) |
| Comparative Example 8 | 80(4) | 32(0) | 8(4) | 12(8) | 32.5 | 22(22) |
| Comparative Example 9 | 94(24) | 44(4) | 24(8) | 40(20) | 1.8 | 36(8) |
| Comparative Example 10 | 24(20) | 10(6) | 4(0) | 16(4) | 0.4 | 6(0) |

EXAMPLE 19

A coating composition E3 having a composition shown in Table 1 was coated on the inner and outer surfaces of a tin-bright-deposited steel plate (T-1, deposited amount of #50/50) having a thickness of 0.23 mm so that the amount coated was 150 mg/dm$^2$ on the inner surface side and 60 mg/dm$^2$ on the outer surface side, followed by baking. The coated steel plate was punched into a disk having a diameter of 94 mm and subjected to ordinary press forming to obtain an upper member in which the inner diameter of the end edge of the portion 66.1 mm. The same coating composition E3 as applied to the upper member was coated on the upper surface by a mandrel coater so that the amount coated was 60 mg/dm$^2$, followed by baking. An epoxy-urea lacquer was spray-coated on the inner surface so that the amount coated was 150 mg/dm$^2$, followed by baking. The coated cup was subjected to the necking processing to obtain a lower member in which the outer diameter of the circumferential end edge was 64.40 mm.

An adhesive described below was coated on the entire circumference of the end edge of the lower member so that the adhesive-applied width was about 4 mm on the outer surface side and about 2 mm on the inner surface side. Namely, a film of the copolyester adhesive C4 (having a composition shown in Table 2) having a thickness of 80 μm and a width of 6 mm was applied to the entire circumference of the outer surface end edge of the lower member heated in advance by high frequency induction heating so that the film protruded from the end edge by about 2 mm, and the protruded portion was folded back by a roll by heating the cut edge again by high frequency induction heating and was applied to the inner surface side, whereby a lower member having the end edge covered with the adhesive was prepared.

The upper member was fitted with the adhesive-applied lower member, and the fitted portion was heated by high frequency induction heating to melt the adhesive. The adhesive was solidified by cooling to obtain a bottle-shaped metal vessel having a capacity of about 500 ml, which comprised the bonded upper and lower members.

The so-prepared metal vessel was filled with synthetic carbonated drink, the pouring opening was plugged, and sterilization was carried out at 42° C. in a can warmer. The standing test at 50° C., the falling test and the denting test at 0° or 25° C. were carried out to evaluate the strength of the bottle. It was found that the metal vessel had practically satisfactory properties.

In the following Examples, coating compositions prepared in the following manner were used.

PREPARATION OF COATING COMPOSITION

Coating compositions used in the following Examples were prepared by dissolving and/or dispersing the following components (1) through (6) in a solvent so that the nonvolatile component content was 40% by weight.

(1) Vinyl Chloride Resin:

A stainless steel autoclave provided with an electromagnetic induction stirrer and a pressure gauge and having an inner capacity of 500 ml was charged with 300 ml of distilled water, 0.6 g of sodium dodecyl benzenesulfonate and 0.10 g of potassium persulfate, and the autoclave was then lidded and cooled to −20° C. in a dry ice-methanol bath. The inside atmosphere was substituted with nitrogen, and 100 g of liquid vinyl chloride monomer was charged. The temperature was elevated to 53° C. and polymerization was carried out with stirring for 8 hours. The temperature was returned to normal temperature, the residual monomer was removed and nitrogen was introduced into the autoclave to effect substitution with nitrogen. The formed emulsion was diluted to 15% by addition of water, and a 5% aqueous solution of sodium chloride was added with stirring to the dilution to precipitate polyvinyl chloride. The precipitated polymer was subjected to water washing, suction filtration and rying. The polymerization degree was 1250.

Vinyl chloride resins having polymerization degrees of 730, 3640 and 4230 were synthesized in the same manner as described above.

(2) Vinyl Chloride Copolymer Resin:

An autoclave was charged with 300 ml of water containing 0.6 g of polyvinyl alcohol having a hydrolysis ratio of 80%, 0.15 g of azobisisobutyronitrile and 10 g of monomeric vinyl acetate, and the charge was cooled to −20° C. in a dry ice-methanol bath. Then, 90 g of liquid vinyl chloride monomer was promptly added to the charge, and the temperature was elevated to 58° C. and polymerization was carried out with stirring for 3 hours to obtain a polymer having a polymerization degree of 325 and a vinyl chloride/vinyl acetate weight ratio of 91/9 (the polymer was designated as "V-1").

Vinyl chloride/vinyl acetate copolymers having a polymerization degree of 290 and a vinyl chloride/vinyl acetate weight ratio of 75/25 (V-2) and a polymerization degree of 315 and a vinyl chloride/vinyl acetate weight ratio of 71/29 (V-3), respectively, were synthesized in the same manner as described above.

Furthermore, a vinyl chloride/vinyl acetate/maleic anhydride terpolymer having a polymerization degree of 305 and a vinyl chloride/vinyl acetate/maleic anhydride weight ratio of 91/8.8/0.2 (V-4), a vinyl chloride/vinyl acetate/maleic anhydride terpolymer having a polymerization degree of 290 and a vinyl chloride/vinyl acetate/maleic anhydride weight ratio of 90/9.5/0.5 (V-5) and a vinyl chloride/vinyl acetate/maleic anhydride terpolymer having a polymerization degree of 295 and a vinyl chloride/vinyl acetate/maleic anhydride weight ratio of 86/11/3 (V-6) were synthesized in the same manner as described above.

The vinyl chloride/vinyl acetate copolymers V-1, V-2 and V-3 were partially saponified with an alkali to obtain a vinyl chloride/vinyl acetate/vinyl alcohol copolymer having a polymerization degree of 325 and a vinyl chloride/vinyl acetate/vinyl alcohol weight ratio of 91/3/6 (V-7), a vinyl chloride/vinyl acetate/vinyl alcohol copolymer having a polymerization degree of 290 and a vinyl chloride/vinyl acetate/vinyl alcohol weight ratio of 75/6/19 (V-8), and a vinyl chloride/vinyl acetate/vinyl alcohol copolymer having a polymerization degree of 315 and a vinyl chloride/vinyl acetate/vinyl alcohol weight ratio of 71/5/24 (V-9), respectively.

(3) Epoxy Resin:
Epon 828.
(4) Amino Resin:
Beckamine P-138.
(5) Phenolic Resin:
The same phenolic resin as described above was used.
(6) Plasticizer:
Epoxidized soybean oil.

EXAMPLES 20 THROUGH 29 AND COMPARATIVE EXAMPLES 11 THROUGH 15

A vinyl coating composition shown in Table 5 was coated on the inner surface of an aluminum plate (3004, H19 chromate-treated) having a thickness of 0.23 mm so that the amount coated was 150 mg/dm$^2$, and the outer surface of the aluminum plate was coated with an epoxy-urea lacquer so that the amount coated was 60 mg/dm$^2$, followed by baking. The coated plate was punched into a disc having a diameter of 94 mm, and the disc was subjected to ordinary press forming to prepare an upper member in which the inner diameter of the end edge of the portion to be bonded was 64.45 mm and a pouring opening having a diameter of 25 mm was formed at the center.

Separately, an aluminum plate (3004, H-19) having a thickness of 0.30 mm was punched into a disc having a diameter of about 142 mm and the disc was formed into a cup having an inner diameter of about 85 mm between drawing punch and die. The cup was subjected to the re-drawing processing again and was ironed by ironing punch and die having a diameter of about 66.1 mm, followed by panelling. The inner and outer surfaces of the so-obtained lower member were degreased, surface-treated, water-washed and dried according to customary procedures. A white lacquer composed of a modified acrylic resin was coated on the outer surface of the lower member except the portion of about 5 mm from the open end edge, and the outer surface was printed and coated with a finishing varnish of the epoxy-ester type. The portion of 5 mm from the open end edge was coated with a coating composition E1 shown in Table 1 by a mandrel coater so that the amount coated was 60 mg/dm². The inner surface of the lower member was spray-coated with an epoxy-acrylic aqueous lacquer so that the amount coated was 150 mg/dm². After the baking treatment, the lower member was subjected to the necking processing to obtain a lower member in which the outer diameter of the circumferential end edge was 64.40 mm.

The adhesive was applied to the entire circumference of the end edge of the outer surface of the lower member in the following manner so that the adhesive-applied width was about 4 mm on the outer surface side and about 2 mm on the inner surface side. More specifically, a film of the copolyester adhesive C5 shown in Table 2, which had a thickness of 65 μm and a width of 6 mm, was applied to the entire circumference of the end edge of the outer surface of the lower member heated in advance by high frequency induction heating, so that the adhesive tape protruded by about 2 mm. The protruded portion was folded back by a roll while the end edge was heated again by high frequency induction heating, and the folded portion was applied to the inner surface side, whereby a lower member having the end edge covered with the adhesive was obtained.

The upper member was fitted with the adhesive-applied lower member, and the fitted portion was heated by high frequency induction heating to melt the adhesive, and the adhesive was solidified by cooling, whereby a bottle-shaped metal vessel having a capacity of about 500 ml, which comprised the bonded upper and lower members, was obtained.

The metal vessel was filled with synthetic carbonated drink, the pouring opening was plugged and sterilization was carried out at 42° C. in a can warmer. The standing test at 50° C., the falling test and the denting test at 0° or 25° C. were carried out to evaluate the strength of the bottle. The obtained results are shown in Table 6.

TABLE 5

| Coating Composition Code | Composition (% by weight) | | | | | | | | | | | | |
|---|---|---|---|---|---|---|---|---|---|---|---|---|---|
| | Vinyl Chloride/Vinyl Acetate/Carboxyl Group- and/or Hydroxyl Group-Containing Vinyl Unit Copolymer | | | | | | | | | Epoxy Group-Containing Thermosetting Resin | | | |
| | Vinyl Chloride Resin Polymerization Degree | | | | Vinyl Chloride/Vinyl Acetate Maleic Anhydride Copolymer | | | Vinyl Chloride/Vinyl Acetate/Vinyl Alcohol Copolymer | | | Epoxy Resin | Phenolic Resin | Amino Resin | Plasticizer |
| | 730 | 1250 | 3640 | 4230 | V-4 | V-5 | V-6 | V-7 | V-8 | V-9 | | | | |
| E15 | | 55 | | | 30 | | | | | | 10 | 5 | | |
| E16 | | 55 | | | | 30 | | | | | 10 | 5 | | |
| E17 | | 55 | | | | | | 30 | | | 10 | | 5 | |
| E18 | | 55 | | | | | | | 30 | | 10 | | 5 | |
| E19 | | 50 | | | | 15 | | 15 | | | 10 | | | 10 |
| E20 | | | 75 | | | | | 15 | | | | 10 | | |
| E21 | | | 45 | | | | | 45 | | | | 10 | | |
| E22 | | | 15 | | | | | 75 | | | | 10 | | |
| E23 | | | 60 | | | | | | 35 | | | | 5 | |
| E24 | | | 60 | | | | | | 12 | | | | 28 | |
| E25 | 50 | | | | | | | 30 | | | 5 | 5 | | 10 |
| E26 | | | | 45 | | | | 30 | | | 5 | 5 | | 15 |
| E27 | | 55 | | | 30 | | | | | | 10 | 5 | | |
| E28 | | 55 | | | | | | | | 30 | 10 | | 5 | |
| E29 | | 90 | | | | | | 9 | | | 1 | | | |

Note
V-4: vinyl chloride/vinyl acetate/maleic anhydride weight ratio = 91/8.8/0.2, polymerization degree = 305
V-5: vinyl chloride/vinyl acetate/maleic anhydride weight ratio = 90/9.5/0.5, polymerization degree = 290
V-6: vinyl chloride/vinyl acetate/maleic anhydride weight ratio = 86/11/3, polymerization degree = 295
V-7: vinyl chloride/vinyl acetate/vinyl alcohol weight ratio = 91/3/6, polymerization degree = 325
V-8: vinyl chloride/vinyl acetate/vinyl alcohol weight ratio = 75/6/19, polymerization degree = 290
V-9: vinyl chloride/vinyl acetate/vinyl alcohol weight ratio = 71/5/24, polymerization degree = 315

TABLE 6

| | Coating Composition Code | Vinyl Chloride Resin Content (% by weight) | Polymerization Degree of Vinyl Chloride Resin | Carboxyl Group and/or Hydroxyl Group Concentration (millimoles per 100 g of resin) | Glass Transition Temperature (°C.) |
|---|---|---|---|---|---|
| Example 20 | E15 | 82.0 | 1250 | 8.6 | 91 |
| Example 21 | E16 | 80.8 | 1250 | 51.7 | 88 |
| Example 22 | E17 | 82.3 | 1250 | 136.4 | 90 |
| Example 23 | E18 | 77.5 | 1250 | 431.8 | 73 |
| Example 24 | E19 | 77.2 | 1250 | 72.5 | 59 |
| Example 25 | E20 | 87.9 | 3640 | 51.7 | 87 |
| Example 26 | E21 | 83.7 | 3640 | 51.7 | 86 |
| Example 27 | E22 | 79.5 | 3640 | 51.7 | 82 |
| Example 28 | E23 | 91.9 | 3640 | 136.4 | 75 |
| Example 29 | E24 | 70.9 | 3640 | 136.4 | 82 |
| Comparative Example 11 | E25 | 75.8 | 730 | 51.7 | 36 |
| Comparative | E26 | 79.8 | 4230 | 51.7 | 37 |

TABLE 6-continued

| | | | | | |
|---|---|---|---|---|---|
| Example 12 Comparative Example 13 | E27 | 82.3 | 1250 | 3.4 | 83 |
| Comparative Example 14 | E28 | 76.3 | 1250 | 545.5 | 74 |
| Comparative Example 15 | E29 | 98.2 | 1250 | 136.4 | 86 |

| | Strength of Bonded Portion | | | | Leakage Ratio (Broken Barrel Ratio)(%) at Denting Test (4 kg, h = 6 mm) | |
|---|---|---|---|---|---|---|
| | Shear Strength (kg/cm²) | | Peel Strength (kg/cm) | | | |
| | just after bonding | after standing at 70° C. | just after bonding | after standing at 70° C. | 0° C. | 25° C. |
| Example 20 | >55 | >53 | 6.2(I) | 5.5(I) | 3(0) | 1(0) |
| Example 21 | >57 | >56 | 7.6(I) | 7.0(I) | 0 | 0 |
| Example 22 | >56 | >56 | 8.0(I) | 6.2(I) | 0 | 0 |
| Example 23 | >58 | >55 | 7.8(I) | 7.4(I) | 0 | 0 |
| Example 24 | >56 | >57 | 8.3(I) | 7.7(I) | 0 | 0 |
| Example 25 | >58 | >58 | 7.4(I) | 6.9(I) | 0 | 0 |
| Example 26 | >58 | >56 | 7.5(I) | 6.8(I) | 0 | 0 |
| Example 27 | >56 | >57 | 7.3(I) | 7.0(I) | 0 | 0 |
| Example 28 | >56 | >57 | 8.0(I) | 7.4(I) | 0 | 0 |
| Example 29 | >56 | >55 | 7.9(I) | 7.0(I) | 0 | 0 |
| Comparative Example 11 | 50 | 47 | 5.2(IV) | 3.9(IV) | 12(0) | 10(0) |
| Comparative Example 12 | 49 | 48 | 4.3(I) | 1.6(I) | 8(2) | 4(2) |
| Comparative Example 13 | 25 | 8 | 2.0(I) | 0.4(I) | 64(10) | 52(4) |
| Comparative Example 14 | 50 | 10 | 4.7(I) | 0.7(IV) | 36(6) | 24(2) |
| Comparative Example 15 | 42 | 6 | 4.0(I) | 0.2(I) | 44(6) | 32(6) |

| | Leakage Ratio (Broken Barrel Ratio)(%) at Falling Test | | After Standing at 50° C. for 3 Months | | |
|---|---|---|---|---|---|
| | method (i) | method (ii) | Volume Change V (ml) | Leakage Ratio Ratio(%) | Dissolution (ppm) of Metal (Aluminum) |
| Example 20 | 0 | 0 | 0.6 | 0 | 0.2 |
| Example 21 | 0 | 0 | 0.2 | 0 | 0.2 |
| Example 22 | 0 | 0 | 0.2 | 0 | 0.2 |
| Example 23 | 0 | 0 | 0.8 | 0 | 0.5 |
| Example 24 | 0 | 0 | 1.2 | 0 | 0.3 |
| Example 25 | 0 | 0 | 0.2 | 0 | 1.8 |
| Example 26 | 0 | 0 | 0.2 | 0 | 1.6 |
| Example 27 | 0 | 0 | 0.2 | 0 | 0.8 |
| Example 28 | 0 | 0 | 0.3 | 0 | 1.0 |
| Example 29 | 0 | 0 | 0.3 | 0 | 1.0 |
| Comparative Example 11 | 2(0) | 4(0) | 2.8 | 18(0) | 4.6 |
| Comparative Example 12 | 0 | 0 | 1.8 | 12(0) | 3.2 |
| Comparative Example 13 | 20(14) | 30(22) | 8.3 | 66(18) | 3.3 |
| Comparative Example 14 | 10(6) | 10(0) | 6.5 | 54(8) | 3.0 |
| Comparative Example 15 | 18(6) | 14(10) | 6.0 | 44(14) | 2.5 |

EXAMPLES 30 THROUGH 33

In the same manner as described in Examples 1 through 8 and Comparative Examples 1 through 5, metal vessels having a capacity of 2 liters were prepared by using the coating composition E16, E18, E21 or E23 shown in Table 5 and the adhesive C1 shown in Table 2, and they were evaluated. The obtained results are shown in Table 7.

TABLE 7

| | | Strength of Bonded Portion | | | |
|---|---|---|---|---|---|
| | | Shear Strength (kg/cm²) | | Peel Strength (kg/cm) | |
| | Coating Composition Code | just after bonding | after standing at 70° C. | just after bonding | after standing at 70° C. |
| Example 30 | E16 | >57 | >56 | 8.3(I) | 8.0(I) |
| Example 31 | E18 | >58 | >55 | 8.5(I) | 7.6(I) |
| Example 32 | E21 | >56 | >56 | 8.1(I) | 7.5(I) |
| Example 33 | E23 | >56 | >57 | 8.4(I) | 7.3(I) |

Leakage Ratio    Leakage Ratio

TABLE 7-continued

| | (Broken Barrel Ratio)(%) at Denting Test (4 kg, h = 6 mm) 0° C. | 25° C. | (Broken Barrel Ratio)(%) at Falling Test method (i) | method (ii) | After Standing at 50° C. for 3 Months Volume Change ΔV(ml) | Leakage Rate (Broken Barrel Ratio)(%) | Dissolution (ppm) of Metal (Aluminum) |
|---|---|---|---|---|---|---|---|
| Example 30 | 0 | 0 | 0 | 0 | 0.2 | 0 | 0.1 |
| Example 31 | 0 | 0 | 0 | 0 | 0.3 | 0 | 0.0 |
| Example 32 | 0 | 0 | 0 | 0 | 0.2 | 0 | 0.2 |
| Example 33 | 0 | 0 | 0 | 0 | 0.2 | 0 | 0.1 |

EXAMPLE 34

A tin-deposited steel plate having a thickness of 0.30 mm was punched into a disc having a diameter of about 142 mm and the disc was formed into a cup having an inner diameter of about 85 mm between drawing punch and die. Then, the cup was subjected to re-drawing processing and was ironed by ironing punch and die having a diameter of 66.1 mm. The outer surface of the cup was coated with the same coating composition (E17 in Table 5) as coated on the upper member, described below, by a mandrel coater so that the amount coated was 60 mg/dm$^2$, and the inner surface was spray-coated with an epoxy-urea type lacquer so that the amount coated was 150 mg/dm$^2$, followed by baking. The coated cup was then subjected to necking processing to obtain a lower member in which the outer diameter of the circumferential end edge was 64.40 mm.

The adhesive was applied to the entire circumference of the end edge of the lower member in the following manner so that the adhesive-applied width was about 4 mm on the outer surface side and about 2 mm on the inner surface side. More specifically, a film of the copolyester adhesive C4 (having the composition and properties shown in Table 2) having a thickness of 80 μm and a width of 6 mm was applied to the entire circumference of the end edge of the outer surface of the lower member heated in advance by high frequency induction heating so that the adhesive tape was protruded from the end edge by about 2 mm. Then, the protruded portion was folded back by a roll and applied to the inner surface side while the end edge was heated again by high frequency induction heating, whereby a lower member having the end edge covered with the adhesive was obtained.

The so-obtained lower member was fitted with the same aluminum upper member as used in Example 22, and the fitted portion was heated by high frequency induction heating to melt the adhesive, and the adhesive was solidified by cooling, whereby a bottle-shaped metal vessel having a capacity of about 500 ml, which comprised the bonded upper and lower members, was prepared.

The metal vessel was filled with synthetic carbonated drink, the pouring opening was plugged and sterilization was carried out at 42° C. in a can warmer. The standing test was conducted at 60° C. It was found that the amount of the dissolved-out metal was very small. When the falling test and the denting test at 0° or 25° C. were carried out to evaluate the strength of the bottle, it was found that the metal vessel had practically satisfactory properties.

What is claimed is:

1. An adhesive primer for a metal vessel, which comprises a composition containing (A) 10 to 80% by weight, based on solids, of particles of a vinyl chloride resin having a polymerization degree of 800 to 4,000 and a particle size of 0.01 to 10 microns, (B) 10 to 80% by weight, based on solids, of a solvent-soluble vinyl chloride/vinyl acetate/carboxyl group- or hydroxyl group-containing vinyl unit copolymer containing carboxyl groups and/or hydroxyl groups at a concentration of 5 to 500 millimoles/100 g of the polymer, the vinyl chloride units being present in an amount of 50 to 95% by weight based on the copolymer (B) and the vinyl acetate units being present in an amount of 2 to 40% by weight based on the copolymer (B), and said copolymer (B) having a polymerization degree of 80 to 1,500 and a molecular weight lower than that of the vinyl chloride resin particles (A), and (C) 2 to 30% by weight, based on solids, of a solvent-soluble thermosetting resin having a reactivity with carboxyl groups and/or hydroxyl groups, said thermosetting resin (C) comprising (i) an epoxy resin derived from bisphenol A and epichlorohydrin and having a molecular weight of 250 to 4,000 and an epoxy equivalent of 180 to 3,500 and (ii) a phenolic resin or amino resin at a weight ratio ((i)/(ii)) of from 95/5 to 20/80, wherein said copolymer (B) and said thermosetting resin (C) are present in a continuous phase as the dispersion medium and the vinyl chloride resin particles (A) are present as the dispersed phase dispersed in said continuous phase.

2. An adhesive primer as set forth in claim 1, wherein the content of the vinyl chloride resin particles (A) is 20 to 60% by weight.

3. An adhesive primer as set forth in claim 1, wherein the polymerization degree of the vinyl chloride resin particles (A) is 900 to 3,000.

4. An adhesive primer as set forth in claim 1, wherein the content of the solvent-soluble copolymer (B) is 10 to 60% by weight.

5. An adhesive primer as set forth in claim 1, wherein the solvent-soluble copolymer (B) contains carboxyl groups and/or hydroxyl groups at a concentration of 10 to 300 millimoles/100 g of the resin.

6. An adhesive primer as set forth in claim 1, wherein the solvent-soluble copolymer (B) is at least one member selected from a partially saponified vinyl chloride/vinyl acetate copolymer, a vinyl chloride/vinyl acetate/acrylic acid copolymer, a partially saponified and partially butylated vinyl chloride/vinyl acetate copolymer, a vinyl chloride/vinyl acetate/methacrylic acid copolymer, a vinyl chloride/vinyl acetate/maleic anhydride copolymer, a vinyl chloride/vinyl acetate/hydroxyethyl acrylate copolymer, a vinyl chloride/vinyl acetate/hydroxyethyl methacrylate copolymer and a partially saponified vinyl chloride/vinyl acetate/acrylic acid copolymer.

7. An adhesive primer as set forth in claim 1, wherein the content of the thermosetting resin (C) is 5 to 20% by weight.

* * * * *